United States Patent
Levant et al.

(10) Patent No.: US 12,469,124 B2
(45) Date of Patent: Nov. 11, 2025

(54) MACHINE LEARNING BASED YIELD PREDICTION

(71) Applicant: Applied Materials Israel Ltd., Rehovot (IL)

(72) Inventors: Boris Levant, Rehovot (IL); Noam Tal, Kiryat Ono (IL); Ran Yacoby, Jerusalem (IL); Lilach Choona, Rehovot (IL); Shaul Pres, Tel Aviv (IL); Jasmin Sonia Linshiz, Rishon LeZion (IL); Shay Yogev, Kibbutz Kfar Menachem (IL); Assaf Ariel, Shoresh (IL)

(73) Assignee: Applied Materials Israel Ltd., Rehovot (IL)

( * ) Notice: Subject to any disclaimer, the term of this patent is extended or adjusted under 35 U.S.C. 154(b) by 351 days.

(21) Appl. No.: 18/113,030

(22) Filed: Feb. 22, 2023

(65) Prior Publication Data
US 2024/0281958 A1    Aug. 22, 2024

(51) Int. Cl.
| | |
|---|---|
| *G06T 7/00* | (2017.01) |
| *G06N 3/04* | (2023.01) |
| *G06N 3/082* | (2023.01) |
| *H01J 37/22* | (2006.01) |
| *H01J 37/28* | (2006.01) |
| *H01L 21/67* | (2006.01) |

(52) U.S. Cl.
CPC ............. *G06T 7/001* (2013.01); *G06N 3/04* (2013.01); *G06N 3/082* (2013.01); *H01J 37/222* (2013.01); *H01J 37/28* (2013.01); *H01L 21/67288* (2013.01); *G06T 2207/10061* (2013.01); *G06T 2207/20081* (2013.01); *G06T 2207/30148* (2013.01); *H01J 2237/24578* (2013.01)

(58) Field of Classification Search
CPC ........... G06T 7/001; G06T 2207/10061; G06T 2207/20081; G06T 2207/30148; G06N 3/04; G06N 3/082; H01J 37/222; H01J 37/28; H01J 21/67288; H01J 2237/24578
See application file for complete search history.

(56) References Cited

U.S. PATENT DOCUMENTS

| | | | |
|---|---|---|---|
| 2017/0200265 A1* | 7/2017 | Bhaskar | ................ G06T 7/0004 |
| 2024/0153043 A1* | 5/2024 | Einy | ........................ G06T 5/60 |

OTHER PUBLICATIONS 2016-2023, IP.com.*

* cited by examiner

*Primary Examiner* — Quang N Vo
(74) *Attorney, Agent, or Firm* — Lowenstein Sandler LLP

(57) ABSTRACT

There is provided a system and method of examination of a semiconductor specimen. The method includes obtaining an e-beam image representative of a given layer of a given structure on the specimen in runtime, processing at least the e-beam image using a ML model, and obtaining yield related prediction with respect to the given structure prior to performing an electrical test. The ML model is previously trained using a training set comprising multiple stacks of e-beam images corresponding to multiple sites of the given structure on one or more training specimens, each stack of e-beam images representative of the at least given layer of a respective site; and test data acquired from an electrical test performed at the multiple sites and related to actual yield of the training specimens, the test data respectively correlated with the stacks of e-beam images and used as ground truth thereof.

20 Claims, 5 Drawing Sheets

MACHINE LEARNING BASED YIELD PREDICTION

TECHNICAL FIELD

The presently disclosed subject matter relates, in general, to the field of examination of a semiconductor specimen, and more specifically, to machine learning based examination for yield prediction.

BACKGROUND

Current demands for high density and performance, associated with ultra large-scale integration of fabricated devices, require submicron features, increased transistor and circuit speeds, and improved reliability. As semiconductor processes progress, pattern dimensions, such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures, such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

Examination processes are used at various steps during semiconductor fabrication for the purpose of process control, such as, e.g., defect related operations, as well as metrology related operations. Effectiveness of examination can be improved by automatization of process(es) such as, for example, defect detection, Automatic Defect Classification (ADC), Automatic Defect Review (ADR), image segmentation, automated metrology-related operations, material characterization, etc.

Automated examination systems ensure that the parts manufactured meet the quality standards expected, and provide useful information on adjustments that may be needed to the manufacturing tools, equipment and/or compositions, depending on the type of defects identified.

In some cases, machine learning technologies can be used to assist the automated examination process so as to promote higher performance. For instance, supervised machine learning can be used to enable accurate and efficient solutions for automating specific examination applications based on sufficiently annotated training images.

SUMMARY

In accordance with certain aspects of the presently disclosed subject matter, there is provided a computerized system of examining a semiconductor specimen, the system comprising a processing and memory circuitry (PMC) configured to: obtain an electron beam (e-beam) image representative of a given layer of a given structure on the semiconductor specimen, the e-beam image acquired in runtime during in-line examination of the semiconductor specimen along a fabrication process thereof; process at least the e-beam image using a machine learning (ML) model, and obtain, as an output of the ML model, yield related prediction with respect to the given structure prior to performing an electrical test thereon, wherein the ML model is previously trained during a training phase using a training set pertaining to at least the given layer, the training set comprising: a plurality of stacks of e-beam images corresponding to a plurality of sites of the given structure on one or more training specimens, each stack of e-beam images representative of the at least given layer of a respective site; and test data acquired from an electrical test performed at the plurality of sites and related to actual yield of the training specimens, the test data respectively correlated with the plurality of stacks of e-beam images and used as ground truth thereof.

In addition to the above features, the system according to this aspect of the presently disclosed subject matter can comprise one or more of features (i) to (xii) listed below, in any desired combination or permutation which is technically possible:

(i). The training set further comprises one or more stacks of optical data acquired by an optical tool and representative of one or more regions on the training specimens that contain the plurality of sites. The one or more stacks of optical data, together with the plurality of stacks of e-beam images, are respectively correlated with the test data.

(ii). The one or more stacks of optical data comprise at least one of optical spectrum data or optical image data captured from the one or more regions. The one or more stacks of optical data are informative of at least one of geometrical or material properties of the one or more regions.

(iii). The training set further comprises sensor data acquired at the plurality of sites by one or more process sensors. The sensor data is respectively correlated with the test data and is informative of physical properties of the plurality of sites.

(iv). The training set further comprises synthetic e-beam images acquired by performing simulation based on design data of the given structure.

(v). Each stack of e-beam images is associated with metadata informative of fabrication properties of the respective site.

(vi). The yield related prediction with respect to the given structure represents estimated functional defectivity of the given structure following a processing step manufacturing the given layer.

(vii). The one or more training specimens each comprises a plurality of layers, and a first ML model is respectively trained for each individual layer of a sampled set of layers from the plurality of layers using a training set pertaining only to the individual layer.

(viii). The one or more training specimens each comprise a plurality of layers, and a second ML model is respectively trained for each individual layer of a sampled set of layers from the plurality of layers using a training set pertaining to the individual layer and one or more preceding layers thereof.

(ix). The processing comprises obtaining one or more e-beam images acquired for one or more preceding layers of the given layer, and processing the e-beam image and the one or more e-beam images together using the ML model. The ML model is trained using a training set pertaining to the given layer and the one or more preceding layers.

(x). The PMC is further configured to select the ML model from a first ML model trained using a training set pertaining to the given layer, and a second ML model trained using a training set pertaining to the given layer and one or more preceding layers thereof.

(xi). The selection of the ML model is based on at least one factor of: processing time for obtaining the yield related prediction, or estimated correlation between the yield related prediction and actual yield of the semiconductor specimen.

(xii). The semiconductor specimen comprises a plurality of layers upon completion of the fabrication process thereof. The PMC is configured to perform the obtaining and the processing for a sampled set of layers from the plurality of layers during the fabrication process, giving rise to yield related prediction for each sampled layer, and analyze the yield related prediction for each sampled layer to provide a yield alert.

In accordance with other aspects of the presently disclosed subject matter, there is provided a method, the method performed by a processor and memory circuitry (PMC) and comprising: obtaining a training set pertaining to at least one layer of a given structure, comprising: a plurality of stacks of electron beam (e-beam) images corresponding to a plurality of sites of the given structure on one or more training specimens, each stack of e-beam images representative of the at least one layer of a respective site; and test data acquired from an electrical test performed at the plurality of sites and related to actual yield of the training specimens, the test data respectively correlated with the plurality of stacks of e-beam images and used as ground truth thereof; and training a machine learning (ML) model using the training set, wherein the trained ML model is usable to provide yield related prediction with respect to the given structure in runtime based on at least one e-beam image representative of the at least one layer of the given structure on a semiconductor specimen to be examined, the at least one e-beam image acquired during in-line examination of the semiconductor specimen along a fabrication process thereof.

These aspects of the disclosed subject matter can comprise one or more of features (i) to (xii) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of examination of a semiconductor specimen, the method comprising: obtaining an electron beam (e-beam) image representative of a given layer of a given structure on the semiconductor specimen, the e-beam image acquired in runtime during in-line examination of the semiconductor specimen along a fabrication process thereof; and processing at least the e-beam image using a machine learning (ML) model, and obtaining, as an output of the ML model, yield related prediction with respect to the given structure prior to performing an electrical test thereon, wherein the ML model is previously trained during a training phase using a training set pertaining to at least the given layer, the training set comprising: a plurality of stacks of e-beam images corresponding to a plurality of sites of the given structure on one or more training specimens, each stack of e-beam images representative of the at least given layer of a respective site; and test data acquired from an electrical test performed at the plurality of sites and related to actual yield of the training specimens, the test data respectively correlated with the plurality of stacks of e-beam images and used as ground truth thereof.

These aspects of the disclosed subject matter can comprise one or more of features (i) to (xii) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
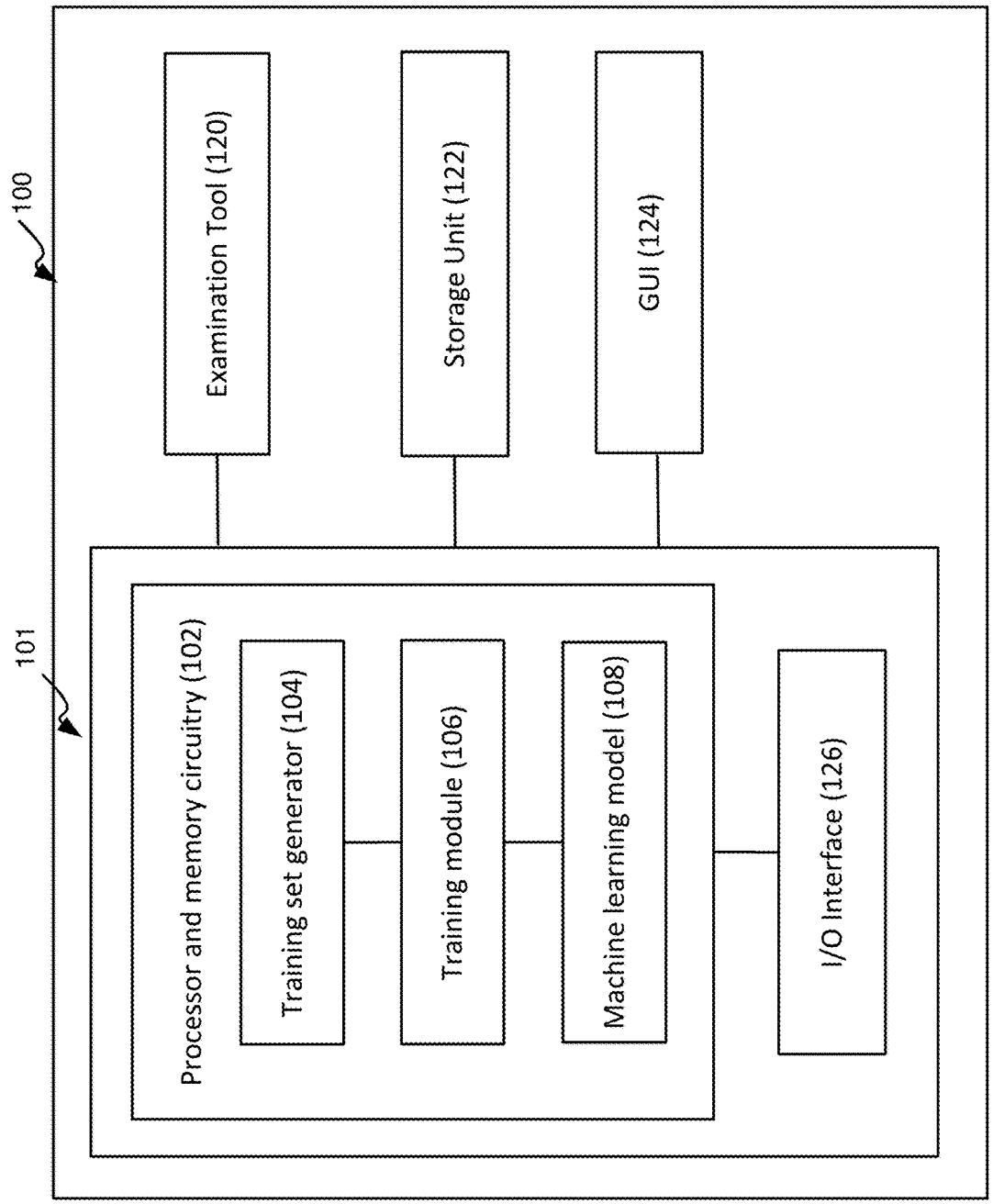
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "processing", "training", "acquiring", "performing", "representing", "selecting", "analyzing", "providing", "correlating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the yield prediction system, the training system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as a "false alarm" defect) which can be disregarded because it has no effect on the functionality of the completed device and does not impact yield.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the fabrication process, derivatives of the captured images/frames obtained by various pre-processing stages, and/or computer-generated synthetic images (in some cases based on design data). It is to be noted that in some cases the image data referred to herein can include, in addition to images (e.g., captured images, processed images, etc.), numeric data associated with the images (e.g., metadata, hand-crafted attributes, etc.). It is further noted that images or image data can include data related to a processing step/layer of interest, or a plurality of processing steps/layers of a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

The process of semiconductor manufacturing often requires multiple sequential processing steps/layers, each one of which could possibly cause errors that may lead to yield loss. Examples of various processing steps can include lithography, etching, depositing, planarization, growth (such as, e.g., epitaxial growth), and implantation, etc. Various in-line examination operations, such as defect-related examination, and/or metrology-related examination, can be performed at different processing steps/layers during the manufacturing process to monitor and control the process. The examination operations can be performed a multiplicity of times, for example after certain processing steps/layers, or the like.

At the end of the production line (EOL) (or at the end of a specific processing step or several processing steps), device performance is tested through various tests such as, e.g., electrical tests, destructive tests, etc. EOL can refer to one of the following: front-end-of-line (FEOL, where the individual devices such as transistors, capacitors, resistors, etc. are patterned on the wafer), middle-end-of-line (MEOL), or back-end-of-line (BEOL, where the individual devices get interconnected with wiring on the wafer, i.e., the metalization layer).

Taking an electrical test as an example, electrical test data, such as, e.g., threshold voltage, leakage current etc., can be obtained from the test to evaluate the proper functioning of certain structures of the dies. Electrical test (e-test) data is highly correlated to feature-level dimensions on the dies, and is considered as the most effective predictor for EOL yield control. Semiconductor devices that fail one or more electrical tests may be isolated from other passing devices. For example, failed dies may be removed from the supply chain (e.g., discarded) or flagged for further testing/fixing, depending on the type and/or level of failure/defectivity.

However, such test data is only available after the fabrication of the semiconductor device, or after certain processing steps are completed in the fabrication process, depending on at which stage of device manufacturing the electrical test is being performed, e.g., whether the electrical test is a MEOL test, or BEOL test. While such tests may provide clues to the source of malfunction (e.g., at feature level), they typically have a relatively long feedback delay time as compared to in-line inspection. For instance, the timeframe for obtaining electrical test data can range from a few weeks to a couple of months, from front to back. In particular, as technology progresses with scaling, the number of processing steps increases, allowing electrical test data to be available only after several months from the beginning of the in-line process.

Efforts were made in an attempt to derive a correlation between in-line examination data and end of line test data. By way of example, in-line metrology operations are performed and various measurements such as critical dimensions (CD), overlay (OVL), etc. are acquired for each layer to be correlated with e-test data. However, it was found to be very difficult to directly correlate either a single measurement (CD/OVL), or multiple measurements in combination, with the e-test data. This is partially due to the fact that e-test data is related to many geometrical parameters as well as material compositions of a semiconductor device, and it remains a challenge how to solve the multi-variant problem, where many geometrical and material characteristics of a specimen are unknown, and the dependency between them is a multi-dimensional problem. Therefore, it is not feasible to provide reliable yield prediction based on such in-line measurements.

Accordingly, certain embodiments of the presently disclosed subject matter propose a system and method capable of providing early yield prediction during the in-line examination of a semiconductor specimen, prior to performing an EOL e-test, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification of various types, segmentation, and/or metrology operations, such as, e.g., critical dimension (CD) measurements, overlay (OVL), etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning, imaging, sampling, reviewing, measuring, classifying and/or other processes provided with regard to the specimen or parts thereof. The examination tools 120 can be implemented as machines of various types. In some embodiments, the examination tool can be implemented as an electron beam machine/tool, such as e.g., Scanning Electron Microscope (SEM), Atomic Force Microscopy (AFM), or Transmission Electron Microscope (TEM), etc.

By way of example, scanning electron microscopes (SEM) is a type of electron microscope that produces images of a specimen by scanning the specimen with a focused beam of electrons. SEM is capable of accurately inspecting and measuring features during the manufacture of semiconductor wafers. The electrons interact with atoms in the specimen, producing various signals that contain information on the surface topography and/or composition of the specimen.

In some cases, at least one of the examination tools 120 has metrology capabilities. Such an examination tool is also referred to as a metrology tool. The metrology tool can be configured to generate image data in response to scanning the specimen and perform metrology operations based on the image data. Depending on the specific way of scanning (e.g., one-dimensional scan such as line scanning, two-dimensional scan in both x and y directions, or dot scanning at specific spots, etc.), the image data can be represented in different formats, such as, e.g., as a gray level profile, a two-dimensional image, or discrete pixels, etc.

In some cases, the same examination tool can provide low-resolution image data and high-resolution image data. The resulting image data can be transmitted—directly or via one or more intermediate systems—to system 101. The present disclosure is not limited to any specific type of examination tools and/or the representation/resolution of image data resulting from the examination tools.

According to certain embodiments of the presently disclosed subject matter, the examination system 100 comprises a computer-based system 101 operatively connected to the examination tools 120 and capable of providing yield related prediction based on machine learning (ML). In some embodiments, system 101 can be configured to provide yield related prediction in runtime using a trained machine learning model based on runtime images obtained during in-line examination of a semiconductor specimen along a fabrication process thereof. Such a system 101 is also referred to as a yield prediction system. In some embodiments, system 101 can be configured as a training system capable of training the above-mentioned ML model during a training/setup phase using a specifically generated training set.

System 101 includes a processor and memory circuitry (PMC) 102 operatively connected to a hardware-based I/O interface 126. PMC 102 is configured to provide processing necessary for operating the system as further detailed with reference to FIGS. 2-3, and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

As aforementioned, in certain embodiments, system 101 can be configured as a training system capable of training a ML model during a training/setup phase. In such cases, functional modules comprised in PMC 102 can include a training set generator 104, a training module 106, and a machine learning model 108. The training set generator 104 can be configured to obtain a training set pertaining to at least one layer of a given structure. The training set comprises: i) a plurality of stacks of electron beam (e-beam) images corresponding to a plurality of sites of the given structure on one or more training specimens, each stack of e-beam images representative of the at least one layer of a respective site; and ii) test data acquired from an electrical test performed at the plurality of sites and related to actual yield of the training specimens, the test data respectively correlated with the plurality of stacks of e-beam images and used as ground truth thereof.

The training module 106 can be configured to train a machine learning model 108 using the training set. The ML model, upon being trained, is usable to provide yield related prediction with respect to the given structure in runtime based on at least one e-beam image representative of the at least one layer of the given structure on a semiconductor specimen to be examined (i.e., a production specimen). The at least one e-beam image is acquired during in-line examination of the semiconductor specimen along a fabrication process thereof. Details of the training process are described below with reference to FIGS. 2 and 5.

The term "yield" used in the field of semiconductors generally refers to an overall yield with respect to a semiconductor specimen such as a wafer. It is normally defined as the percentage of non-defective chips/devices on the semiconductor specimen (i.e., the chips that meet specification requirements in terms of, e.g., electrical and reliability performance). Yield of a specimen is related to tested functional defectivity with respect to the semiconductor devices on the specimen (e.g., the dies on the wafer), which in turn depends on the tested functionalities of specific structures on the semiconductor devices. Therefore, test data resulting from electrical tests performed on the specific structures is highly correlated with the actual yield and can be used as an effective predictor for yield control.

According to certain embodiments, system 101 can be configured to provide yield related prediction in runtime using the trained ML model based on runtime images. In such cases, one or more functional modules comprised in PMC 102 can include the ML model 108 which has been trained as described above. The PMC 102 can be configured to obtain, via the I/O interface 126, an electron beam image representative of a given layer of a given structure on a semiconductor specimen (a production specimen). The e-beam image is acquired in runtime during in-line examination of the semiconductor specimen along a fabrication process thereof.

The trained ML model 108 is used to process at least the e-beam image, and obtain, as an output of the ML model, yield related prediction with respect to the given structure prior to performing an electrical test thereon. As described above, the ML model is previously trained using a training set specifically generated as described above. Details of the runtime examination process are described below with reference to FIGS. 3 and 5.

Operation of system 101, PMC 102 and the functional modules therein will be further detailed with reference to FIGS. 2-3.

According to certain embodiments, the ML model 108 referred to herein can be implemented as various types of machine learning models, such as, e.g., decision tree, Support Vector Machine (SVM), Artificial Neural Network (ANN), regression model, Bayesian network, or ensembles/combinations thereof etc. The learning algorithm used by the ML model can be any of the following: supervised learning, unsupervised learning, or semi-supervised learning, etc. The presently disclosed subject matter is not limited to the specific type of ML model or the specific type or learning algorithm used by the ML model.

In some embodiments, the ML model can be implemented as a deep neural network (DNN). DNN can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a deep neural network can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a deep neural network is referred to as a training set.

It is noted that the teachings of the presently disclosed subject matter are not bound by specific architecture of the ML or DNN as described above.

In some cases, additionally to system 101, the examination system 100 can comprise one or more examination modules, such as, e.g., defect detection module and/or Automatic Defect Review Module (ADR) and/or Automatic Defect Classification Module (ADC) and/or a metrology-related module and/or other examination modules which are usable for examination of a semiconductor specimen. The one or more examination modules can be implemented as stand-alone computers, or their functionalities (or at least part thereof) can be integrated with the examination tool 120. In some cases, the ML model 108 can be comprised in the one or more examination modules. Optionally, the ML model 108 can be shared between the examination modules or, alternatively, each of the one or more examination modules can comprise its own ML model 108.

According to certain embodiments, system 101 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store runtime images/training images and/or derivatives thereof produced by the examination tool 120. Accordingly, the images can be retrieved from the storage unit 122 and provided to the PMC 102 for further processing.

In some embodiments, system 101 can optionally comprise a computer-based Graphical User Interface (GUI) 124 which is configured to enable user-specified inputs related to system 101. For instance, the user can be presented with a visual representation of the specimen (for example, by a display forming part of GUI 124), including image data of the specimen. The user may be provided, through the GUI, with options of defining certain operation parameters, such as, e.g., the given structure, the given layer to be examined, the selection and configuration of the ML model, etc. The user may also view the operation results, such as, e.g., yield related prediction, on the GUI. In some cases, system 101 can be further configured to send, via I/O interface 126, the results to the examination tool 120 for further processing. In some cases, system 101 can be further configured to send the results to the storage unit 122, and/or external systems (e.g., Yield Management System (YMS) of a fabrication plant (FAB)). A yield management system (YMS) in the context of semiconductor manufacturing is a data management, analysis, and tool system that collects data from the FAB, especially during manufacturing ramp ups, and helps engineers find ways to improve yield. YMS helps semiconductor manufacturers and FABs manage high volumes of production analysis with fewer engineers. These systems analyze the yield data and generate reports. YMS can be used by Integrated Device Manufacturers (IMD), FABs, fabless semiconductor companies, and Outsourced Semiconductor Assembly and Test (OSAT).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. By way of example, the examination tool 120 and the system 101 can be located at the same entity (in some cases hosted by the same device) or distributed over different entities, depending on specific system configurations and implementation needs. In some cases, system 101 can be cloud based.

It is further noted that in other embodiments at least some of examination tools 120, storage unit 122 and/or GUI 124 can be external to the examination system 100 and operate in data communication with system 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

Figure 2:
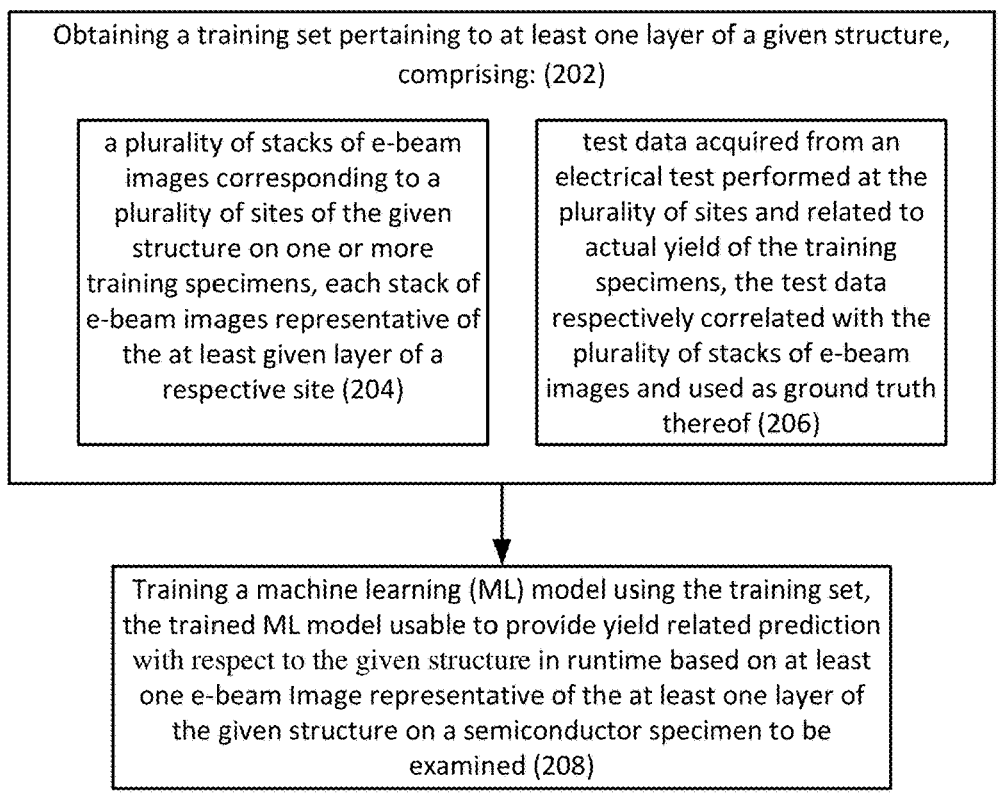
FIG. 2 illustrates a generalized flowchart of training a machine learning model usable for providing yield related prediction in accordance with certain embodiments of the presently disclosed subject matter.
Figure 3:
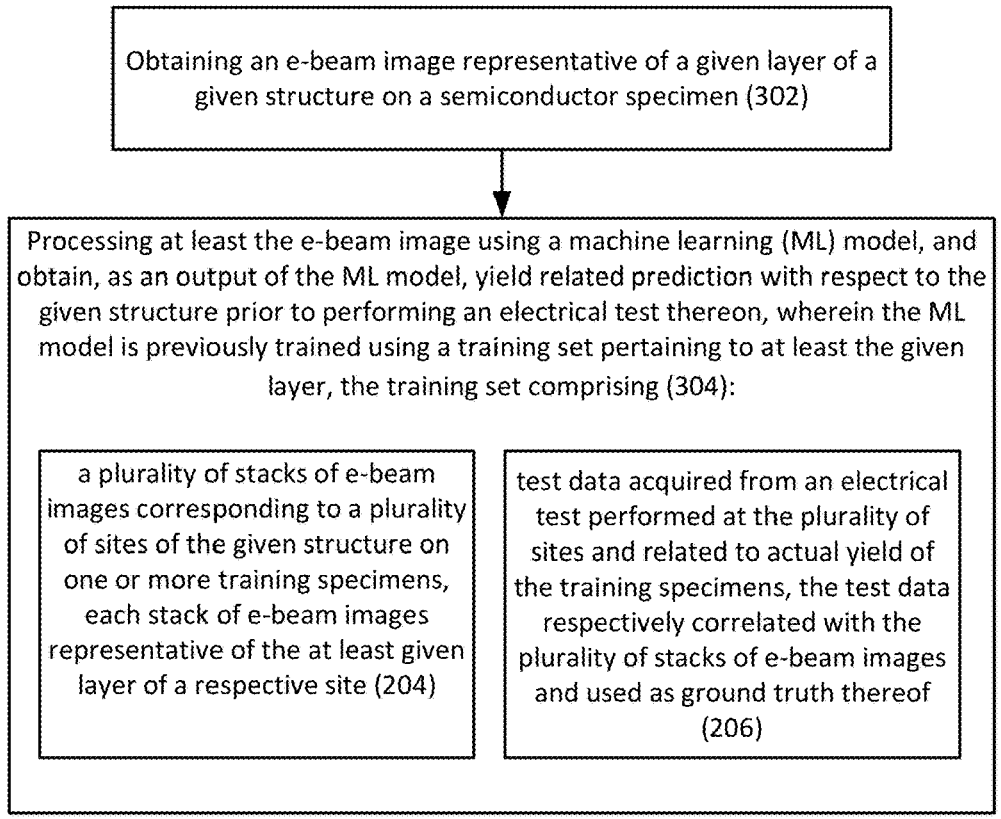
FIG. 3 illustrates a generalized flowchart of performing runtime yield related prediction using a trained machine learning model in accordance with certain embodiments of the presently disclosed subject matter.

While not necessarily so, the process of operation of systems 101 and 100 can correspond to some or all of the stages of the methods described with respect to FIGS. 2-3. Likewise, the methods described with respect to FIGS. 2-3 and their possible implementations can be implemented by systems 101 and 100. It is therefore noted that embodiments discussed in relation to the methods described with respect to FIGS. 2-3 can also be implemented, mutatis mutandis as various embodiments of the systems 101 and 100, and vice versa.

Referring to FIG. 2, there is illustrated a generalized flowchart of training a machine learning model usable for providing yield related prediction in accordance with certain embodiments of the presently disclosed subject matter.

Training data used for training a ML model in supervised learning normally include one or more training samples, each including one or more training images and corresponding ground truth data associated therewith. Ground truth data serves as label data of the corresponding training image.

As described in FIG. 2, a training set pertaining to at least one layer of a given structure can be obtained (202) (e.g., by the training set generator 104 in PMC 102). The term "structure" used in the present disclosure refers to a structural feature or element on a semiconductor specimen, such as, e.g., memory cells, transistors, and/or test structures, which, upon completion of fabrication, can be correlated to electrical test data for verifying its designated functionality. In some embodiments, the given structure referred to herein can represent a structure of interest to be examined on a semiconductor specimen.

Specifically, the training set comprises: i) a plurality of stacks of training images (e.g., e-beam images) (204) corresponding to a plurality of sites of the given structure on one or more training specimens, each stack of training images representative of the at least one layer of a respective site; and ii) test data (206) acquired from an electrical test performed at the plurality of sites and related to actual yield of the training specimens, the test data respectively correlated with the plurality of stacks of e-beam images and used as ground truth thereof.

In some embodiments, a training image can be a "real world" image (an image that is actually captured) of a semiconductor specimen obtained in a fabrication process thereof. Depending on different examination applications, a training image can be obtained in various ways. By way of example, in a metrology application, the image can be obtained by a metrology tool for purpose of pattern control and measurements. By way of another example, in an application of defect inspection and detection, the image can be an inspection image obtained by one or more inspection tools for detection of potential defects (i.e., defect candidates). By way of yet another example, in a defect review application or a defect classification application, the image can be a review image obtained by one or more review tools at various defect candidate locations, for the purpose of ascertaining whether a defect candidate detected by the inspection tools is indeed a defect, and/or ascertaining the class/type of the defect.

The "real world" training images as described above can be acquired using various examination modalities. By way of example, the stacks of training images can be e-beam images (typically with higher resolution) acquired by an e-beam tool, such as, e.g., SEM.

Figure 4:
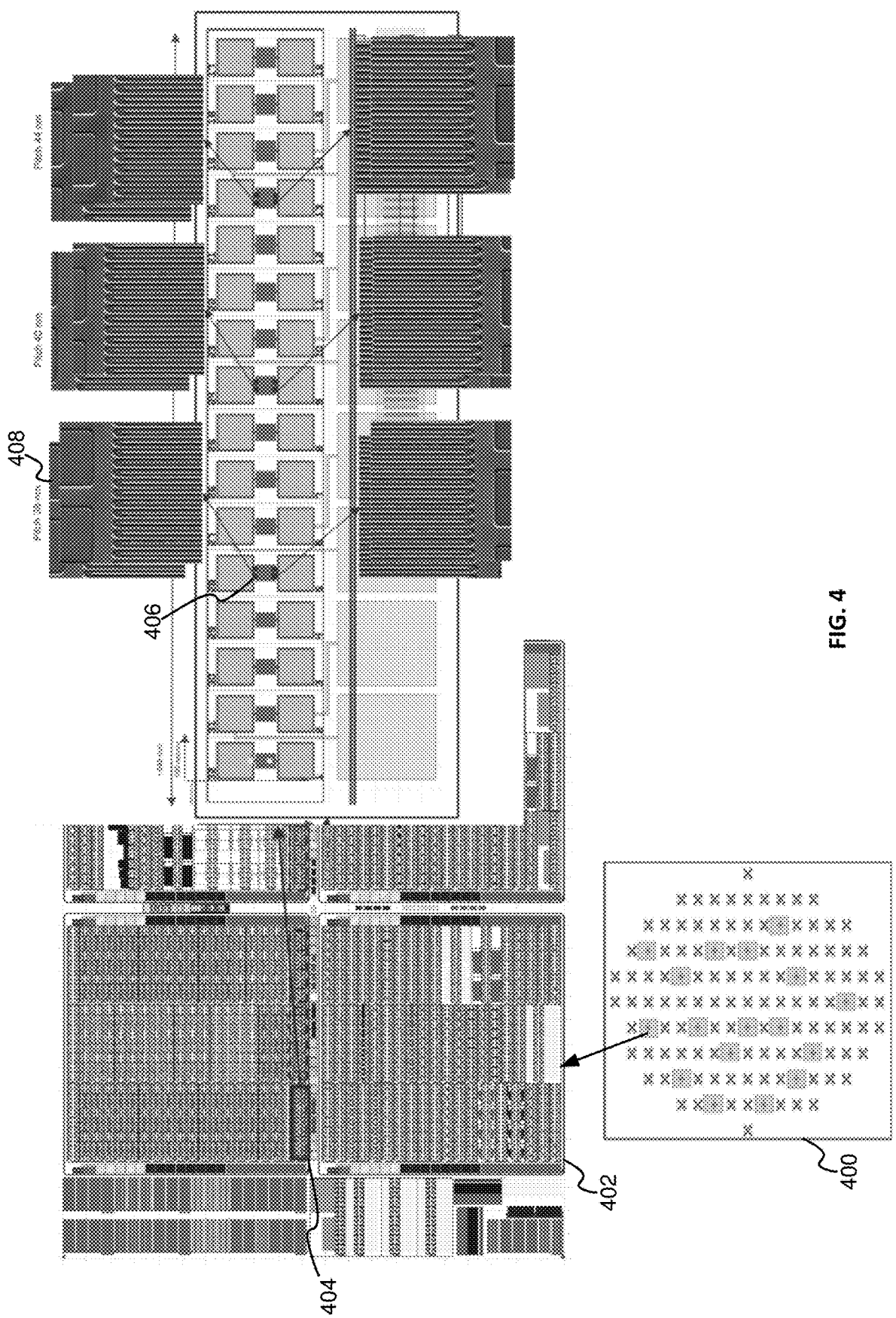
FIG. 4 illustrates an example of training images acquired for a given structure on a semiconductor specimen in accordance with certain embodiments of the presently disclosed subject matter.

Referring now to FIG. 4, there is illustrated an example of training images acquired for a given structure on a semiconductor specimen, in accordance with certain embodiments of the presently disclosed subject matter.

As shown, a die 402 of an exemplary training specimen 400 is illustrated in an enlarged view. Training images 408 are respectively captured for multiple sites 406 (e.g., six sites from each pitch, and three pitches per die in the present example) from a region 404 of the die. Each of the multiple sites contains the same structure as illustrated in the captured images 408 (exemplified as e-beam images). As described above, a semiconductor specimen is typically manufactured by multiple processing steps/layers, such as, e.g., lithography, etching, depositing, planarization, growth, and implantation, etc. In some cases, the training images 408 are acquired for a single layer of a given structure. In some other cases, the training images 408 can be acquired for multiple layers of the given structure. Therefore, a stack of training images representative of one or more layers of a given structure can be acquired for each site, where the number of images in the stack may range between 1 and n, corresponding to the number of layers being examined.

The stack of images representative of the one or more layers can be sequentially acquired during the in-line examination, after specific processing steps of the fabrication process of the specimen. Alternatively, the stack of images can be acquired after all the layers of the specimen are already fabricated, by using different imaging conditions. By way of example, the upper layers can be grabbed using a standard landing energy and through a secondary electron (SE) detector, while the hidden layers can be grabbed using a higher landing energy and through a backscattered electron (BSE) detector.

Similarly, the image acquisition as described above can be performed for all selected dies (marked by "+" in the figure) on the training specimen 400. In some cases, one or more additional training specimens similar to specimen 400 may be available for additional image acquisition. In such ways, multiple stacks of training images corresponding to multiple sites of the given structure on one or more training specimens can be acquired and constitute part of the training set.

For purpose of training the ML model using supervised learning, ground truth data for the training images should be obtained. Continuing with the above example, an electrical test can be respectively performed at the multiple sites (where the multiple stacks of training images are acquired) after in-line examination of the training specimens. Electrical test (e-test) data, such as threshold voltage, leakage current etc., provides indication of functional defectivity with respect to the specific structures at these sites, thus directly relates to the actual yield of the specimens. By way of example, the overall yield of a specimen can be derived based on the tested functionality of each die on the specimen, which in turn depends on the test data obtained from testing specific structures on the dies. The test data respectively correlate with the multiple stacks of training images and can be used as ground truth for the correlated stacks of images. The stacks of images and the test data together constitute the training set.

Once the training set is generated, the ML model (e.g., the ML model 108) can be trained (208) (e.g., by the training module 106 in PMC 102) using the training set in a training phase. The training is done using supervised learning, where the test data for a given site is used as ground truth label data of the stack of training images acquired therefrom. A cost function used during training of the ML model can be based on, e.g., the accuracy rate of the yield related prediction by the ML model with respect to the test data, and, optionally, also based on a penalty for incorrect prediction. The training can be performed in an iterative manner, as described above.

The ML model, upon being trained, can be deployed in runtime and is usable to provide yield related prediction with respect to the given structure in runtime based on at least one e-beam image representative of the at least one layer of the given structure on a semiconductor specimen to be examined, as described below in further detail with respect to FIG. 3. The at least one e-beam image is a runtime image acquired during in-line examination of the semiconductor specimen along a fabrication process thereof.

Figure 5:
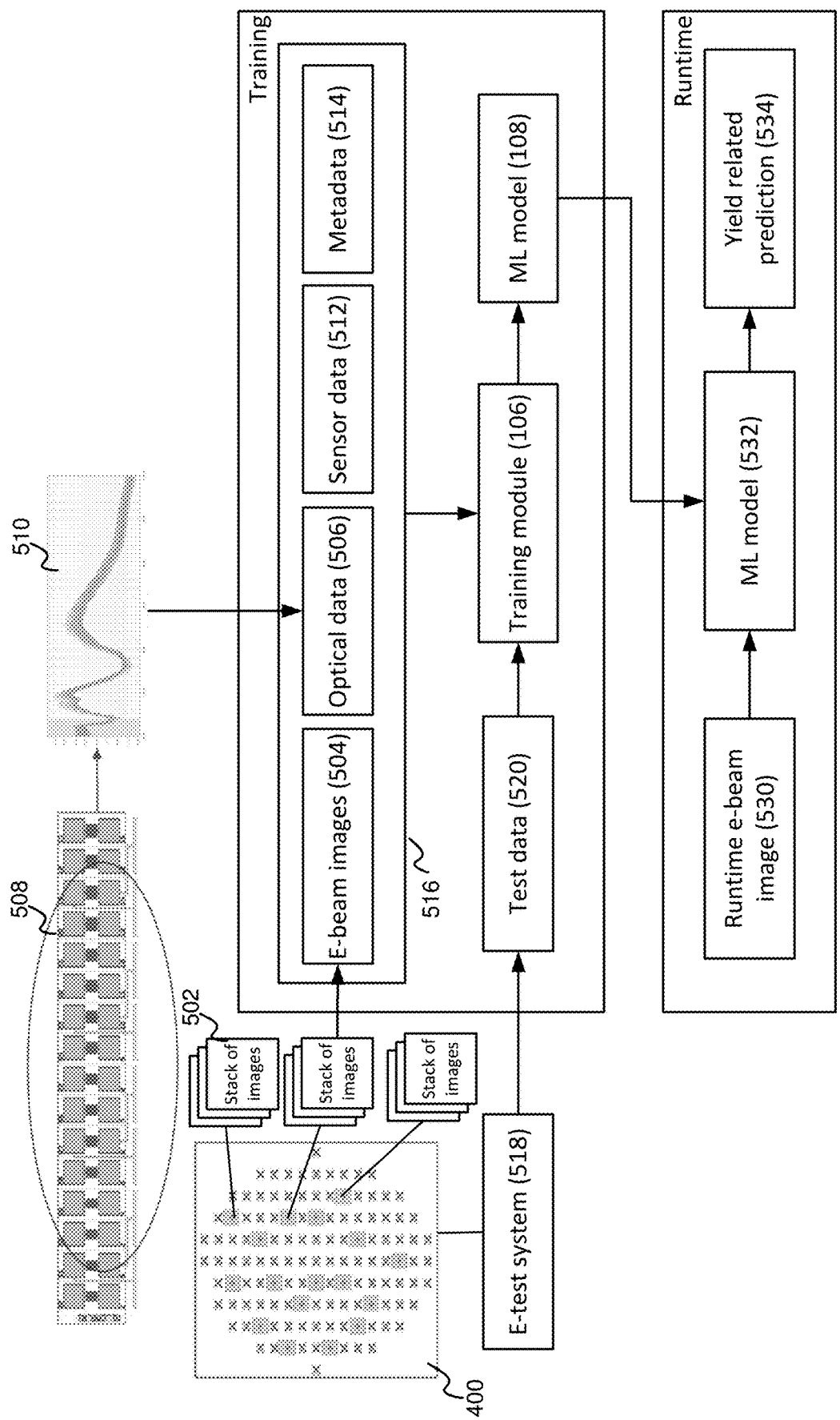
FIG. 5 shows a schematic illustration of a training phase with various options of training data and a runtime phase for providing yield-related prediction with respect to a given structure of a production specimen in accordance with certain embodiments of the presently disclosed subject matter.

According to certain embodiments, additional training data can be collected and used for training the ML model. FIG. 5 illustrates, among others, a training phase with various options of additional training data in addition to e-beam images in accordance with certain embodiments of the presently disclosed subject matter.

Continuing with the example presented in FIG. 4, multiple stacks of training images 502 corresponding to multiple sites of a given structure on the specimen 400 and/or one or more additional training specimens can be acquired. By way of example, these images can be acquired as e-beam images 504 which typically have a higher resolution.

Additionally, in some cases, optical data 506 can be acquired and constitute part of the training data. By way of example, one or more stacks of optical data can be acquired by an optical tool to represent one or more regions on the training specimens that contain the plurality of sites of the given structure. FIG. 5 illustrates an exemplary region 508 which is a larger area containing the multiple sites 406 as shown in FIG. 4. The optical data can be represented in the form of optical spectrum data, such as the exemplified spectrum data 510 measured from the region 508, and/or optical image data, such as optical images captured for the region by the optical tool. Such optical data is informative of geometrical properties (e.g., dimensions with respect to structures in the regions, distances between different structures/objects, etc.) and/or material properties of the plurality of regions, thus can provide contextual information for the sites and the e-beam images acquired for the sites. Including the optical data in the training set together with the e-beam images enriches the training set with additional information and has the technical effects of improving accuracy of the prediction. It is to be noted that although a large region 508 is exemplified which contains all the sites, this is only illustrated as an example. In some cases, multiple regions respectively containing the multiple sites can be extracted for acquiring the optical data, and the present disclosure is not limited to the specific number or size of such regions. The optical data, together with the e-beam images, can be respectively correlated with the test data.

Additionally or alternatively, in some cases, the training set further comprises sensor data 512 acquired at the plurality of sites by one or more process sensors. The one or more process sensors can comprise at least one of: a pressure sensor, a temperature sensor, a flow meter, an electrical sensor, a radio frequency (RF) sensor, a vibration sensor, and any other types of sensors usable for acquiring physical properties of a specimen. The sensor data can be informative of physical properties of the plurality of sites, and can be represented, e.g., in time traces of various process variables, such as pressure, temperature, RF power, current, voltage, flow control position, etc. The sensor data, together with the e-beam images (and optionally also the optical data), can be respectively correlated with the test data.

In some embodiments, each stack of e-beam images can be associated with metadata 514 informative of fabrication properties of the respective site, such as, e.g., the location of a site in a die/specimen, time of image acquisition, lot of the specimen, etc. In cases where optical data 506 is available, metadata 514 can also include metadata associated with the optical data.

According to certain embodiments, in cases of an insufficient number of actual training images, the training set can further comprise synthetic/simulated e-beam images acquired by performing simulation based on design data (e.g., CAD) of the given structure. The image simulation can be performed by simulating one or more effects caused by one or more physical processes of the semiconductor specimen, such as, e.g., a fabrication process, a scanning process, and/or a signal processing process, etc. By way of example, physical effects caused by the fabrication process (FP) of the specimen can be simulated to represent how the design patterns in the design data would actually appear on the wafer. In other words, the FP simulation transfers the design intent layout to the expected processed pattern on the wafer. By way of another example, physical effects of the scanning process can be simulated by representing the e-beam signal based on yield of electrons emitted from the specimen and detected by a detector. By way of yet another example, the signal processing simulation reflects the influence of the signal processing path in the examination tool on the e-beam signal. A simulated image after performing one or more of the above simulations is a simulated e-beam image, such as a simulated SEM image.

The electrical test can be performed by an e-test system 518 to obtain the test data 520. In some embodiments, the e-test system 518 can be configured to perform a test on the semiconductor specimen at the end of production line (i.e., EOL test), e.g., after the fabrication of a semiconductor device. In some embodiments, the e-test system 518 can be configured to perform a test after certain processing steps are completed during the fabrication process.

The test data 520 and the training image data 516 with various options of compositions as described above are provided to the training module 106 as the training set, which is used to train the ML model 108 during a training phase.

As described above, each of the one or more training specimens (and the structures thereof) may comprise a plurality of layers. In some embodiments, a ML model (also referred to as a first ML model, or a single layer model) can be respectively trained for each individual layer of a sampled/selected set of layers from the plurality of layers using a training set pertaining only to the individual layer. Additionally or alternatively, a ML model (also referred to as a second ML model, or a multi-layer model) can be respectively trained for each individual layer of the sampled set of layers using a training set pertaining to the individual layer and one or more preceding layers thereof.

Taking a Static random-access memory (SRAM) bit cell as an example, the bit cell is composed of two rotationally symmetrical areas called 'Top Care Area' and 'Bottom Care Area' each containing three transistors: NMOS Pull-Down (NMOSPDT), NMOS Pass-Gate (NMOSPGT) and PMOS Pull-Up (PMOSPUT). Each transistor can be individually characterized through an appropriate back-end routing. It normally takes tens of processing steps to fabricate the structure. For purpose of in-line examination, a set of processing steps can be sampled/selected therefrom based on their known impacts on device characteristics or yield, including the following five steps: shallow trench isolation (STI) formation, gate etching, dummy gate removal, contact Chemical Mechanical Polishing (CMP) and M1 etching. SEM images of the two care areas can be collected at the sampled set of processing steps for selected dies of a wafer, such as, e.g., the ones marked by "+" in FIGS. 4 and 5. For instance, the SEM images for the first three layers (the upper layers) can be grabbed using standard landing energy, while SEM images for the last two layers (the lower layers) with hidden structures can be grabbed using high landing energy, so as to simultaneously acquire SE images and BSE images (see-through images) of the buried structures. The five SEM images acquired for a specific site form a stack of SEM images corresponding to the site, which can be stacked into the same channel of the ML model.

The six transistors can be measured electrically on the selected dies by an electrical test performed at the end of the fabrication process, giving rise to test data used as ground truth for the SEM images.

During training, for each single layer of the five layers, a ML model can be trained using the stacked SEM images acquired for the single layer and the test data. Such a trained model is referred to as a single layer model. Additionally or alternatively, a ML model can be trained using the SEM images acquired for the single layer and any preceding layers, together with the test data. Such a trained model is referred to as a multi-layer model.

Taking layer 4 (contact CMP) as an example, a single layer model can be trained using the SEM images acquired for layer 4 from all selected dies and the test data. A multi-layer model can be trained using the SEM images acquired for layer 4 as well as the preceding layers 1-3 from all selected dies, together with the test data. In cases where images of only some of the preceding layers (e.g., layers 2-3) are available, a multi-layer model can be trained using the available images of the preceding layers and the image of the present layer.

Figure 6:
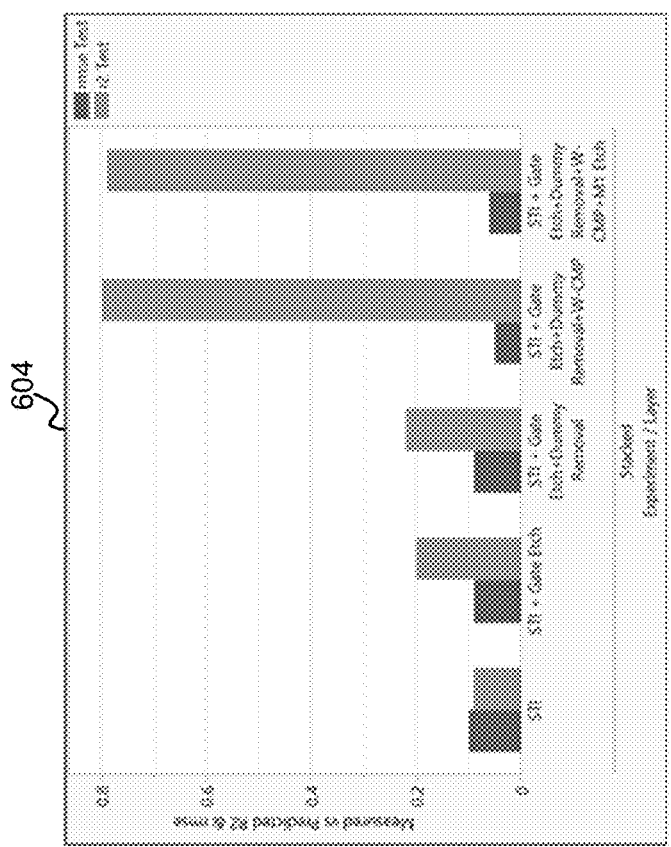
FIG. 6 illustrates two correlation graphs representing correlation between the yield related prediction and the test data related to actual yield in single layer models and multi-layer models in accordance with certain embodiments of the presently disclosed subject matter.
Figure 6:
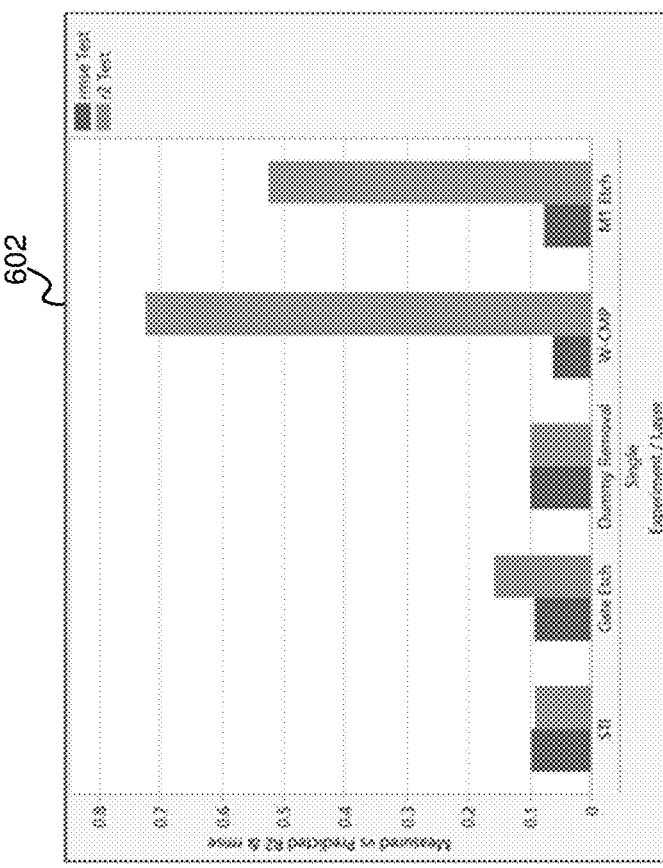

Turning now to FIG. 6, there are illustrated two correlation graphs representing correlation between the yield related prediction and the test data (in terms of e-test voltage) related to actual yield in single layer models and multi-layer models in accordance with certain embodiments of the presently disclosed subject matter.

Continuing with the SRAM example as described above, graph 602 demonstrates the correlation (using two correlation tests: $R^2$, and Root Mean Square Error (RMSE)) between actual e-test data (represented by voltage Vth actually measured and extracted by e-test) and predicted Vth calculated by single layer ML models (i.e., the ML model for each single layer is trained using training images of the singer layer). The correlation results in graph 602 illustrate that $R^2$ keeps increasing while RMSE keeps decreasing, indicating that prediction correlation keeps increasing when the layers progress from STI Etch to M1 Etch. In particular, on the 4th layer, the predicted Vth closely matches the actual one, leading $R^2$ to improve up to 0.71 indicating a high correlation.

Graph 604 demonstrates the correlation between the actual Vth and predicted Vth calculated by multi-layer ML models (e.g., the ML model for each given layer is trained using stacked training images of the given layer and all the preceding layers). This is based on the assumption that the e-test performance may be affected by interactions between multiple processing steps in the fabrication process. The correlation results demonstrate even more improved correlation (higher as compared to the correlation of single layer models in graph 602), up to $R^2$ of 0.75 at the 4th layer (W-CMP).

Based on the correlation data in graphs 602 and 604, it is demonstrated that the highest correlation between the actual Vth and the predicted Vth appears at the $4^{th}$ layer. In addition, for all layers, the correlation by the multi-layer models is generally higher than the correlation by the single-layer models, indicating that interactions between multiple processing steps in the fabrication process indeed influence the e-test performance, and that the multi-layer model based on accumulative information collected from several layers can provide higher accuracy of e-test prediction. Such correlation information collected during training can be usable in runtime in cases where both single layer and multi-layer models exist, as will be described below in further detail.

Turning now to FIG. 3, there is illustrated a generalized flowchart of performing runtime yield related prediction using a trained machine learning model in accordance with certain embodiments of the presently disclosed subject matter.

An electron beam (e-beam) image representative of a given layer of a given structure on a semiconductor specimen can be obtained (302). The e-beam image can be acquired (e.g., by the examination tool 120) in runtime during in-line examination of the semiconductor specimen along a fabrication process of the specimen.

The e-beam image (or in some cases at least the e-beam image) can be processed (304) using a machine learning (ML) model (e.g., the ML model 108 in PMC 102), and obtain, as an output of the ML model, yield related prediction with respect to the given structure prior to performing an electrical test thereon. The ML model is previously trained during a training phase using a training set pertaining to at least the given layer, as described above with respect to FIG. 2.

Specifically, the training set can comprise: i) a plurality of stacks of e-beam images corresponding to a plurality of sites of the given structure on one or more training specimens, each stack of e-beam images representative of the at least given layer of a respective site; and ii) test data acquired from an electrical test performed at the plurality of sites and related to actual yield of the training specimens, the test data respectively correlated with the plurality of stacks of e-beam images and used as ground truth thereof.

Details of the training, such as various options of training data and ML models, is described above with reference to FIG. 2. In particular, as mentioned above, each of the training specimens may comprise a plurality of layers. A single layer model can be respectively trained for each individual layer of a sampled/selected set of layers from the plurality of layers using a training set pertaining only to the individual layer. Additionally or alternatively, a multi-layer model can be respectively trained for each individual layer of the sampled set of layers using a training set pertaining to the individual layer and one or more preceding layers thereof. Therefore, in some cases, for a given layer of a specimen, there may exist two available ML models previously trained for that layer: a single layer model and a multi-layer model.

In runtime, during in-line examination of a semiconductor specimen along a fabrication process thereof, an image of a given layer of a structure is acquired by an examination tool, which will be processed by a ML model trained for that layer to provide runtime yield prediction. In some embodiments, a single layer model is trained for each given layer of a specimen, and used to process runtime images of the given layer to provide yield related prediction based on that layer alone. Using the single layer model in runtime has the advantages of providing a fast prediction and reducing the time of yield failure detection, as the ML model only needs to process a single layer image.

In some other embodiments, a multi-layer model is trained for each given layer of a specimen, and used to process runtime images of the given layer to provide yield related prediction based on stacked images of the given layer and the preceding layers. In such cases, upon obtaining the e-beam image for the given layer, one or more e-beam images acquired for one or more preceding layers of the given layer should be obtained (e.g., from the storage unit). The e-beam image for the given layer and the one or more e-beam images for the preceding layers can be processed together using the multi-layer ML model.

Using the multi-layer model in runtime has the advantages of providing a more reliable prediction which is highly correlated to the actual yield, e.g., by stacking several processing layers into the same channel of the ML model which can provide more accurate prediction results. As the ML model needs to process multiple layer images, the prediction can be configured to be performed online or offline, depending on the customer's actual needs.

In some further embodiments, in cases where there are two ML models (i.e., the single layer and multi-layer models) available for a given layer, it may be needed to select a ML model from the two models which will be used for processing the given layer image. The selection can be based on at least one of the following factors/considerations: processing time by the ML models for obtaining the yield related prediction (also referred to as return of investment (ROI)), estimated correlation between the yield related prediction and actual yield of the semiconductor specimen, and any other factors which may impact the system's performance.

In some cases, the semiconductor specimen to be examined in runtime comprises a plurality of layers upon completion of the fabrication process thereof. The image acquisition (block 202) and processing (block 204) by the ML model can be repeated for a sampled set of layers from the plurality of layers during the fabrication process (e.g., upon image acquisition for each sampled layer), to obtain yield related prediction for each layer. The yield related prediction obtained for each layer can be analyzed so as to be able to provide a yield alert, e.g., in cases where the analysis shows a trend of yield drop.

Referring back to FIG. 5, the ML model, upon being trained, can be deployed in runtime (illustrated as, e.g., the trained ML model 532) in the Fab for yield-related prediction with respect to the given structure of a production specimen. As illustrated, during runtime, a runtime e-beam image 530 representative of a given layer of the given structure on a production specimen to be examined is acquired by an examination tool and processed by the trained ML model 532 to obtain yield related prediction for the given layer. By way of example, the yield related prediction can be represented in similar forms as the electrical test data, such as, e.g., threshold voltage, leakage current etc. The yield related prediction for a given layer of a given structure represents the estimated functional defectivity of the structure following the processing step that manufactured the given layer. In cases where there is an alert provided by the yield related prediction for a given layer, care should be taken to investigate possible causes for the alert for further testing/fixing.

It is to be noted that the yield prediction method and system as described above can be applied to different examination applications, such as, e.g., a metrology application, a defect detection application, and a defect review application. Accordingly, the images processed by the ML model can be acquired by different examination tools configured for different examination applications.

According to certain embodiments, the training process as described above with reference to FIG. 2 can be included as part of a process for generating an examination recipe usable by the examination system 100 and/or the examination tool 120 for online examination in runtime (where the ML model, once trained, can serve as part of the examination recipe). Therefore, the presently disclosed subject matter also includes a system and method for generating an examination recipe during a recipe setup phase as described with reference to FIG. 2 (and various embodiments thereof). It is to be noted that the term "examination recipe" should be expansively construed to cover any recipe that can be used by an examination tool for any examination application including the embodiments as described above.

It is to be noted that examples illustrated in the present disclosure, such as, e.g., the exemplary specimens and structures, the illustrated images thereof, the examination tools and applications, etc., are illustrated for exemplary purposes, and should not be regarded as limiting the present disclosure in any way. Other appropriate examples/implementations can be used in addition to, or in lieu of the above.

Among advantages of certain embodiments of the yield prediction process as described herein is that it provides an early yet reliable yield related prediction during the in-line examination of a semiconductor specimen, prior to performing an EOL electrical test which has a relatively long feedback delay time, and the predicted yield is proven to be highly correlated with the actual yield by e-test.

This is enabled by training a machine learning model based on full image information (e.g., e-beam images) existing for given layers of a structure, rather than relying on specific measurements acquired from the images. It is demonstrated by experiments that utilizing full image information can be very efficient and effective for monitoring yield indicators affected by multiple process variations.

Among further advantages of certain embodiments of the yield prediction process as described herein is that it provides options of using a single layer model and a multi-layer model for the prediction, each of which has their respective advantages. As described above, using the single layer model in runtime has the advantages of providing a relatively fast prediction, as the ML model only needs to process a single layer image. Using a single layer model may be a more appropriate choice when yield prediction is required to be performed online during the in-line examination of the specimen where there is strict throughput requirement. On the other hand, using a multi-layer model has the advantages of providing more reliable prediction which is highly correlated to the actual yield, e.g., by stacking several processing layers into the same channel of the ML model which can lead to more accurate prediction results.

In addition, the presently proposed prediction method, in particular by the multi-layer model, is expected to gain more effectivity with the progressing of process complexity and design rules shrinkage which leads to the fact that each processing step controls a smaller portion of yield predictors.

Among further advantages of certain embodiments of the training process as described herein, is that it provides various options of training data compositions, by optionally collecting optical data, sensor data, metadata, etc., in addition to the e-beam images, which enables the ML model to be trained using enriched training data informative of various properties, such as, e.g., contextual, geometrical, material, physical and fabrication properties of the specimen to be examined, thus further improving the performance of the trained ML model in terms of robustness and accuracy.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized system of examining a semiconductor specimen, the computerized system comprising a processor and memory circuitry (PMC) configured to:
   obtain an electron beam (e-beam) image representative of a given layer of a given structure on the semiconductor specimen, the e-beam image acquired in runtime during in-line examination of the semiconductor specimen along a fabrication process thereof; and
   process at least the e-beam image using a machine learning (ML) model, and obtain, as an output of the ML model, yield related prediction with respect to the given structure prior to performing an electrical test thereon, wherein the ML model is previously trained during a training phase using a training set pertaining to at least the given layer, the training set comprising:
      a plurality of stacks of e-beam images corresponding to a plurality of sites of the given structure on one or more training specimens, each stack of e-beam images representative of the at least the given layer of a respective site; and
      test data acquired from an electrical test performed at the plurality of sites and related to actual yield of the training specimens, the test data respectively correlated with the plurality of stacks of e-beam images and used as ground truth thereof.

2. The computerized system according to claim 1, wherein the training set further comprises one or more stacks of optical data acquired by an optical tool and representative of one or more regions on the training specimens that contain the plurality of sites, the one or more stacks of optical data, together with the plurality of stacks of e-beam images, respectively correlated with the test data.

3. The computerized system according to claim 2, wherein the one or more stacks of optical data comprise at least one of optical spectrum data or optical image data captured from the one or more regions, and are informative of at least one of geometrical or material properties of the one or more regions.

4. The computerized system according to claim 1, wherein the training set further comprises sensor data acquired at the plurality of sites by one or more process sensors, the sensor data respectively correlated with the test data and being informative of physical properties of the plurality of sites.

5. The computerized system according to claim 1, wherein the training set further comprises synthetic e-beam images acquired by performing simulation based on design data of the given structure.

6. The computerized system according to claim 1, wherein each stack of e-beam images is associated with metadata informative of fabrication properties of the respective site.

7. The computerized system according to claim 1, wherein the yield related prediction with respect to the given structure represents estimated functional defectivity of the given structure following a processing step manufacturing the given layer.

8. The computerized system according to claim 1, wherein the one or more training specimens each comprise a plurality of layers, and a first ML model is respectively trained for each individual layer of a sampled set of layers from the plurality of layers using a training set pertaining only to the individual layer.

9. The computerized system according to claim 1, wherein the one or more training specimens each comprise a plurality of layers, and a second ML model is respectively trained for each individual layer of a sampled set of layers from the plurality of layers using a training set pertaining to the individual layer and one or more preceding layers thereof.

10. The computerized system according to claim 1, wherein the processing comprises obtaining one or more e-beam images acquired for one or more preceding layers of the given layer, and processing the e-beam image and the one or more e-beam images together using the ML model, wherein the ML model is trained using a training set pertaining to the given layer and the one or more preceding layers.

11. The computerized system according to claim 1, wherein the PMC is further configured to select the ML model from: a first ML model trained using a training set pertaining to the given layer, and a second ML model trained using a training set pertaining to the given layer and one or more preceding layers thereof.

12. The computerized system according to claim 11, wherein the selection of the ML model is based on at least one factor of: processing time for obtaining the yield related prediction, or estimated correlation between the yield related prediction and actual yield of the semiconductor specimen.

13. The computerized system according to claim 1, wherein the semiconductor specimen comprises a plurality of layers upon completion of the fabrication process thereof, and the PMC is configured to perform the obtaining and the processing for a sampled set of layers from the plurality of layers during the fabrication process, giving rise to yield related prediction for each sampled layer, and analyze the yield related prediction for each sampled layer to provide a yield alert.

14. A computerized method, the method comprising:
   obtaining a training set pertaining to at least one layer of a given structure, comprising:
      a plurality of stacks of electron beam (e-beam) images corresponding to a plurality of sites of the given structure on one or more training specimens, each stack of e-beam images representative of the at least one layer of a respective site; and
      test data acquired from an electrical test performed at the plurality of sites and related to actual yield of the training specimens, the test data respectively correlated with the plurality of stacks of e-beam images and used as ground truth thereof; and
   training a machine learning (ML) model using the training set, wherein the trained ML model is usable to provide yield related prediction with respect to the given structure in runtime based on at least one e-beam image representative of the at least one layer of the given structure on a semiconductor specimen to be examined, the at least one e-beam image acquired during in-line examination of the semiconductor specimen along a fabrication process thereof.

15. The computerized method according to claim 14, wherein the training set further comprises one or more stacks of optical data acquired by an optical tool and representative of one or more regions on the training specimens that contain the plurality of sites, the one or more stacks of optical data, together with the plurality of stacks of e-beam images, respectively correlated with the test data.

16. The computerized method according to claim 14, wherein the one or more training specimens each comprise a plurality of layers, and a first ML model is respectively trained for each individual layer of a sampled set of layers from the plurality of layers using a training set pertaining only to the individual layer.

17. The computerized method according to claim 14, wherein the one or more training specimens each comprise a plurality of layers, and a second ML model is respectively trained for each individual layer of a sampled set of layers from the plurality of layers using a training set pertaining to the individual layer and one or more preceding layers thereof.

18. The computerized method according to claim 14, wherein the yield related prediction with respect to the given structure represents estimated functional defectivity of the given structure following a processing step manufacturing the given layer.

19. The computerized method according to claim 14, further comprising: obtaining correlation between yield related prediction obtained by the ML model during training and the test data, the correlation usable in runtime for selecting a trained ML model to be used for providing prediction for the given layer.

20. A non-transitory computer readable storage medium tangibly embodying a program of instructions that, when executed by a computer, cause the computer to perform a method of examining a semiconductor specimen, the method comprising:

obtaining an electron beam (e-beam) image representative of a given layer of a given structure on the semiconductor specimen, the e-beam image acquired in runtime during in-line examination of the semiconductor specimen along a fabrication process thereof; and processing at least the e-beam image using a machine learning (ML) model, and obtaining, as an output of the ML model, yield related prediction with respect to the given structure prior to performing an electrical test thereon, wherein the ML model is previously trained during a training phase using a training set pertaining to at least the given layer, the training set comprising:

a plurality of stacks of e-beam images corresponding to a plurality of sites of the given structure on one or more training specimens, each stack of e-beam images representative of the at least the given layer of a respective site; and test data acquired from an electrical test performed at the plurality of sites and related to actual yield of the training specimens, the test data respectively correlated with the plurality of stacks of e-beam images and used as ground truth thereof.

* * * * *